(12) United States Patent
Springer

(10) Patent No.: US 12,514,401 B2
(45) Date of Patent: Jan. 6, 2026

(54) OUTDOOR PELLET GRILL

(71) Applicant: Walmart Apollo, LLC, Bentonville, AR (US)

(72) Inventor: Zachary Springer, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 210 days.

(21) Appl. No.: 17/446,759

(22) Filed: Sep. 2, 2021

(65) Prior Publication Data
US 2022/0071444 A1  Mar. 10, 2022

Related U.S. Application Data

(60) Provisional application No. 63/074,983, filed on Sep. 4, 2020.

(51) Int. Cl.
*A47J 37/07* (2006.01)

(52) U.S. Cl.
CPC ....... *A47J 37/0704* (2013.01); *A47J 37/0754* (2013.01); *A47J 37/0786* (2013.01)

(58) Field of Classification Search
CPC . A47J 37/0704; A47J 37/0754; A47J 37/0786
See application file for complete search history.

(56) References Cited

U.S. PATENT DOCUMENTS

| | | | | |
|---|---|---|---|---|
| 1,038,849 | A | * | 9/1912 | Carter .................... F24C 3/027 126/41 R |
| 1,199,656 | A | * | 9/1916 | Beatty .................... F23N 3/007 126/58 |

(Continued)

FOREIGN PATENT DOCUMENTS

| | | |
|---|---|---|
| CN | 303503968 S | 12/2015 |
| CN | 207803377 U | 9/2018 |

(Continued)

OTHER PUBLICATIONS

Amazon., "Oster Titanium Infused DuraCeramic Reversible Grill/Griddle, Black," dated Sep. 20, 2019, 9 pages.

(Continued)

*Primary Examiner* — Michael G Hoang
*Assistant Examiner* — Logan P Jones
(74) *Attorney, Agent, or Firm* — Foley IP Law, PLLC

(57) ABSTRACT

An outdoor pellet grill that includes a grill housing including: a grill base; a rear wall portion secured to the grill base; a top wall portion secured to the rear wall portion; and a hinged grill cover providing selective enclosure around an interior cooking space within the grill housing. The outdoor pellet grill includes a cooking platform, pellet hopper, burn pot, auger, and actuator. The burn pot and the heat baffle are located beneath the cooking platform and provide heat to food from below. The auger extends between the pellet hopper and the burn pot and transports pellets of fuel from the pellet hopper to the burn pot. The actuator is rotatably coupled to the heat baffle and includes a first set of apertures positioned for selective alignment with a second set of corresponding apertures in the heat baffle to govern regulation of flames from the burn pot.

16 Claims, 12 Drawing Sheets

(56) References Cited

U.S. PATENT DOCUMENTS

| | | | |
|---|---|---|---|
| 3,384,068 A * | 5/1968 | Perry | F24C 15/322 |
| | | | 126/21 A |
| D218,352 S | 8/1970 | Hoch | |
| 3,568,047 A | 3/1971 | Look et al. | |
| 3,658,047 A * | 4/1972 | Happel | F24C 15/16 |
| | | | 126/337 R |
| 3,837,329 A | 9/1974 | Mutchler | |
| 3,896,242 A * | 7/1975 | Moore | A23B 4/0526 |
| | | | 426/314 |
| D253,627 S | 12/1979 | Adamson | |
| 4,389,562 A * | 6/1983 | Chaudoir | A21B 1/48 |
| | | | 219/400 |
| 4,823,684 A | 4/1989 | Traeger et al. | |
| D302,703 S | 8/1989 | Foran et al. | |
| D348,284 S | 6/1994 | Thorud et al. | |
| D348,694 S | 7/1994 | Evenson | |
| D420,851 S | 2/2000 | Wagner | |
| 6,203,834 B1 | 3/2001 | Anders et al. | |
| D465,693 S | 11/2002 | Coleman et al. | |
| D489,221 S | 5/2004 | Pai | |
| 6,810,792 B1 * | 11/2004 | Knight | A47J 37/0704 |
| | | | 99/450 |
| D503,067 S | 3/2005 | Lubowicki | |
| 7,066,169 B2 | 6/2006 | Feldewerth et al. | |
| D536,918 S | 2/2007 | Wood | |
| 7,228,792 B2 | 6/2007 | Crawford et al. | |
| D546,116 S | 7/2007 | Tseng | |
| D560,415 S | 1/2008 | Wood et al. | |
| D584,562 S | 1/2009 | Chau et al. | |
| D613,117 S | 4/2010 | Richburg | |
| D614,915 S | 5/2010 | Schnitman et al. | |
| D655,989 S | 3/2012 | Nelms | |
| D657,183 S | 4/2012 | May | |
| D671,788 S | 12/2012 | Slater | |
| D679,331 S | 4/2013 | Stravitz | |
| D680,797 S | 4/2013 | Chung | |
| D683,177 S | 5/2013 | Brennan | |
| D694,056 S | 11/2013 | Dahle | |
| D732,874 S | 6/2015 | Chung | |
| D736,026 S | 8/2015 | Kam et al. | |
| D737,627 S | 9/2015 | Goldenstein et al. | |
| D741,105 S | 10/2015 | Ryan | |
| D745,802 S | 12/2015 | Yao | |
| 9,357,879 B2 | 6/2016 | Ortner et al. | |
| 9,585,518 B1 * | 3/2017 | Phillips | A47J 37/0718 |
| 9,814,354 B2 | 11/2017 | McADAMS et al. | |
| D805,343 S | 12/2017 | Magee | |
| 10,098,500 B1 * | 10/2018 | Hutton | A23B 4/052 |
| D833,207 S | 11/2018 | Zemel | |
| 10,213,051 B2 | 2/2019 | Colston | |
| D857,439 S | 8/2019 | Chung | |
| D869,894 S | 12/2019 | Nicoll et al. | |
| D896,561 S | 9/2020 | Measom et al. | |
| D901,244 S | 11/2020 | Baker et al. | |
| D915,120 S | 4/2021 | Bennion et al. | |
| D921,413 S | 6/2021 | Fitzpatrick | |
| D926,510 S | 8/2021 | Chung | |
| D927,917 S | 8/2021 | Yueh | |
| D927,918 S | 8/2021 | Dahle et al. | |
| D934,611 S | 11/2021 | Dahle et al. | |
| D940,496 S | 1/2022 | Wang | |
| 2003/0172919 A1 * | 9/2003 | Rabas | F24C 15/322 |
| | | | 126/21 R |
| 2004/0094142 A1 * | 5/2004 | Christensen | A47J 37/067 |
| | | | 126/41 R |
| 2005/0034716 A1 | 2/2005 | Harbin | |
| 2007/0277800 A1 | 12/2007 | Chiang | |
| 2009/0025705 A1 | 1/2009 | Hatjopoulos et al. | |
| 2009/0235918 A1 | 9/2009 | Espina et al. | |
| 2013/0298894 A1 * | 11/2013 | Kleinsasser | A47J 37/0704 |
| | | | 126/25 R |
| 2015/0079250 A1 * | 3/2015 | Ahmed | A47J 37/0704 |
| | | | 99/481 |
| 2015/0316268 A1 * | 11/2015 | Mackle | F24B 1/024 |
| | | | 110/165 R |
| 2017/0164783 A1 | 6/2017 | Sauerwein et al. | |
| 2017/0231430 A1 * | 8/2017 | Moon | A47J 37/1266 |
| | | | 99/331 |
| 2017/0332838 A1 | 11/2017 | Dahle et al. | |
| 2018/0125083 A1 * | 5/2018 | Carter | A23L 13/06 |
| 2018/0168397 A1 * | 6/2018 | Colston | A47J 36/38 |
| 2018/0368618 A1 * | 12/2018 | Measom | A47J 37/0704 |
| 2019/0256338 A1 | 8/2019 | Moss | |
| 2019/0274479 A1 * | 9/2019 | Chung | A47J 37/0704 |
| 2019/0290064 A1 * | 9/2019 | Colston | A23B 4/0523 |
| 2019/0365152 A1 * | 12/2019 | Dahle | A47J 37/0704 |
| 2020/0116349 A1 * | 4/2020 | Rahmani | F23B 7/002 |
| 2021/0127899 A1 * | 5/2021 | James | F24B 1/195 |
| 2021/0180793 A1 * | 6/2021 | James | F24B 13/006 |
| 2021/0244233 A1 | 8/2021 | Bush, III et al. | |
| 2021/0315416 A1 | 10/2021 | Fullmer et al. | |
| 2021/0369052 A1 * | 12/2021 | Fullmer | A23B 4/044 |
| 2022/0022688 A1 | 1/2022 | Barajas, Jr. et al. | |
| 2022/0071444 A1 | 3/2022 | Springer | |
| 2022/0071445 A1 | 3/2022 | Springer | |

FOREIGN PATENT DOCUMENTS

| | | |
|---|---|---|
| CN | 110753507 A | 2/2020 |
| DE | 202017105189 U1 | 9/2017 |
| GB | 90040052390005 | 5/2017 |
| KR | 101721368 B1 | 3/2017 |

OTHER PUBLICATIONS

"Amazon.com: Cuisinart GR-55 Griddler Stainless Steel Nonstick Grill/Griddle Combo," dated Sep. 19, 2019, 8 pages.

Application and File History for U.S. Appl. No. 29/749,461 mailed on Sep. 4, 2020, Inventor: Zachary Springer, 39 pages.

Application and File History for U.S. Patent Application No. U.S. Appl. No. 29/749,463, filed Sep. 4, 2020, Inventor: Zachary Springer, 40 pages.

Application and File History for U.S. Appl. No. 29/749,468, filed Sep. 4, 2020, Inventor: Zachary Springer, 39 pages.

Application and File History for U.S. Patent Application No. U.S. Appl. No. 29/749,472, filed Sep. 4, 2020, Inventor: Zachary Springer, 39 pages.

Application and File History for U.S. Appl. No. 29/749,475, filed Sep. 4, 2020, Inventor: Zachary Springer, 40 pages.

Blaze Outdoor Products., "Blaze 30-Inch Built-In Gas Griddle Lte," mailed on Sep. 19, 2019, 3 pages.

"Campingaz Gas Plancha L, 2 Stainless Steel Burner Tabletop Gas BBQ, 7.5kW Power, Portable Table Ttop Grill, Large Non-Stick Steel Griddle, Teppanyaki Cooking Plate", Jan. 15, 2018, Posted at https://www.amazon.co.uk/, [site visited Mar. 22, 2022], Retrieved from https://www.amazon.co.uk/, 2 pages.

"Camplux Enjoy Outdoor Life Gas Griddle Grill, Portable Camping Griddles, 22,000 BTU, 2 Burners Tabletop Griddle with1 lb Regulator for Camping, RV and Tailgating (GG302S), 22 inch", Sep. 18, 2020, Posted at https://www.amazon.com/, [site visited 2022], Retrieved from https://www.amazon.com/, 10 pages.

Chinese Application, Application No. 201721097557.7, filed Aug. 29, 2017, 15 pages.

Chinese Application Design No. 305786550, published on May 19, 2020, Author: Wang Maoxian, 8 pages.

"Cuisinart Grill with Removable Plate", Aug. 28, 2020, Posted at https://www.amazon.co.uk/, [site visited Mar. 22, 2022], Retrieved from https://www.amazon.co.uk/, 3 pages.

"Cuisinart Grill with Removable Plate," Amazon [online], Aug. 28, 2020, [site visited Mar. 22, 2022], Retrieved from Internet: URL: https://www.amazon.ae/Cuisinart-Collection-Entertaining-Temperature-PL60U/dp/B08GYHGJQ6, 8 pages.

EQuipped GR24-T 24" Gas Griddle—Thermostatic, 3/4" Steel Plate, Natural Gas, dated Sep. 19, 2019, 5 pages.

"Expert Grill Atlas Pellet Grill and Smoker," Walmart [online], [site visited Oct. 6, 2021], Retrieved from Internet: URL: https://www.walmart.com/ip/Expert-Grill-Atlas-Pellet-Grill-and-Smoker/808216815, 13 pages.

(56) References Cited

OTHER PUBLICATIONS

Home Depot, "Dyna-Glo 4-Burner Propane Gas Grill in Stainless Steel with Griddle- DGX440SGP," Retrieved from internet URL: htttps://www.homedepot.com/p/Dyna-Glo-4-Burner-Propane-Gas-Grill-in-Stainless-Steel-with-Griddle-DGX440SGP/310506606, 2021, 6 pages.

Lowes., "Blackstone 3-Burner Natural Gas or Liquid Propane Flat Top Grill," Retrieved from internet URL: https://www.lowes.com/pd/Blackstone-Culinary-3-Burner-30-In-with-Hood/1003254674, site visited on Nov. 11, 2021, 6 pages.

"The GMG Difference: How A Pellet Grill Works," dated Sep. 23, 2019, 10 pages.

The Spruce Eats., "Weber Genesis II E-210 Propane Grill Review," Jul. 23, 2019, Retrieved from Internet URL: https://www.thespruceeats.com/weber-genesis-ii-e-210-propane-grill-review-4694327, on Sep. 19, 2019, 17 pages.

Walmart., "Expert Grill Commodore Pellet Grill and Smoker," Retrieved from Internet URL: https://www.walmart.com/ip/Expert-Grill-Cornmodore-Pellet-Grill-and-Smoker/675237961, retrieved on Oct. 6, 2021, 12 pages.

Walmart, "Expert Grill Concord 3-in-1 Pellet Grill, Smoker, and Propane Gas Griddle, "Retrieved from internet URL: https://www.walmart.com/ip/Expert-Grill-Concord-3-In-1-Pellet-Grill-Smoker-and-Propane-Gas-Griddle/505997762, 2021, 13 pages.

Walmart., "Expert Grill Pioneer 28-Inch Portable Propane Gas Griddle," Retrieved from Internet URL: https://www.walmart.com/ip/Expert-Grill-Pioneer-28-Inch-Portable-Propane-Gas-Griddle/768889699?athbdg=L1300, Retrieved on Oct. 6, 2021, 10 pages.

Walmart., "Pit Boss Platinum KC Combo, Wi-Fi and Bluetooth Wood Pellet and Gas Grill," Retrieved from Internet URL: https://www.walmart.com/ip/Pit-Boss-Platinum-KC-Combo-Wifi-and-Bluetooth-Wood-Pellet-and-Gas-Grill/716604652, available prior to Sep. 4, 2020, 31 pages.

Walmart.com., "George Foreman Dual Surface Griddle and Grill, GFG240X," dated Sep. 18, 2019, 17 pages.

Zhang, Mengxiang, "Office Action & Search Report", Chinese Application No. 2021110409556, mailed Jul. 31, 2025, 12 pages.

\* cited by examiner

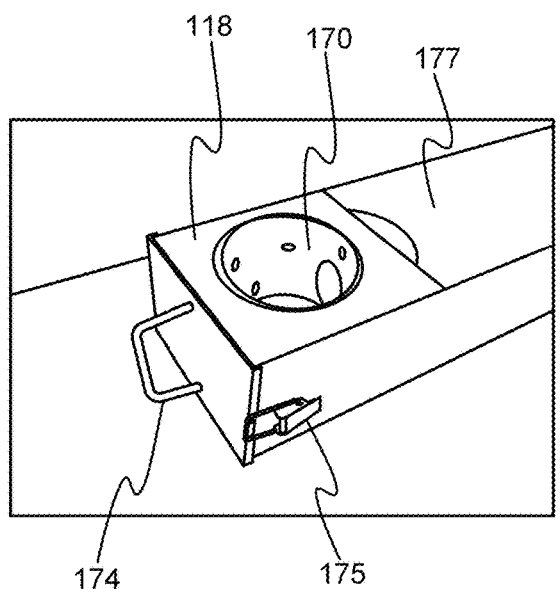 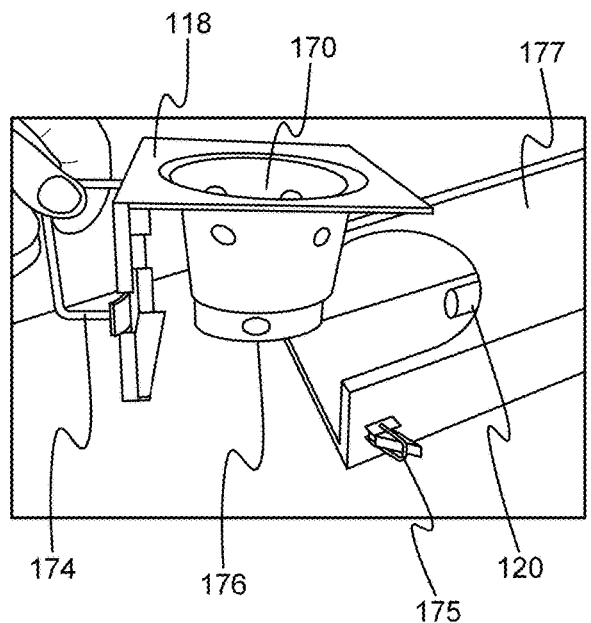
FIG. 2C  FIG. 2D

OUTDOOR PELLET GRILL

RELATED APPLICATION

The present application claims the benefit of U.S. Provisional Application No. 63/074,983 filed Sep. 4, 2020, which is hereby incorporated herein in its entirety by reference.

TECHNICAL FIELD

This disclosure relates to an outdoor pellet grill, and more particularly to an outdoor pellet grill and related methods providing pellet fueled cooking and related features for improved outdoor grilling and food preparation.

BACKGROUND

Outdoor grills are used throughout the world and provide one of the most common, convenient, and versatile forms of cooking. However, the specific attributes and features of a type of grill and its properties have a significant impact of the styles of cooking, flavors, temperature control, ease of use, and other basic properties. New and improved types of outdoor cooking equipment are potentially important and useful devices to everyday food preparation tasks.

Pellet grills are increasingly popular grill types which can provide desirable cooking flavors, heat distribution and control, and versatility. However, additional improvements to features and operations of existing pellet grills to provide enhanced cooking flavors, heat distribution and control, and cooking options are continually sought after.

Accordingly, there is a desire for an improved apparatus and/or related methods for improved pellet grills and cooking techniques which are more effective and which overcome past difficulties.

SUMMARY

Embodiments described or otherwise contemplated herein substantially provide the advantages of improved pellet grill features and operations that enable enhanced cooking flavors, heat distribution and control, and versatility.

One embodiment relates to an outdoor pellet grill that includes a grill housing including: a grill base; a rear wall portion secured to the grill base; a top wall portion secured to the rear wall portion; and a hinged grill cover providing selective enclosure around an interior cooking space within the grill housing. The outdoor pellet grill includes a cooking platform that holds food in the interior cooking space, coupled within the grill housing. The outdoor pellet grill includes a pellet hopper adjacent the grill housing as well as a burn pot covered by a heat baffle located in the grill base. The burn pot and the heat baffle are located beneath the cooking platform and provide heat to food from below. The outdoor pellet grill includes an auger extending between the pellet hopper and the burn pot that transports pellets of fuel from the pellet hopper to the burn pot. The outdoor pellet grill also includes an actuator that is rotatably coupled to the heat baffle. The actuator includes a first set of apertures positioned for selective alignment with a second set of corresponding apertures in the heat baffle to govern regulation of flames from the burn pot.

In some embodiments, the outdoor pellet grill includes a squirrel cage blower in the grill base proximate the burn pot and heat baffle. In such embodiments, the outdoor pellet grill can include grill ductwork that defines a cavity extending from the squirrel cage blower in the grill base, up the rear wall portion and along the top wall portion of the grill housing to an opening above the cooking platform. The squirrel cage blower selectively directs smoke produced by the burn pot to the opening above the cooking platform such that smoke can be focused on food on the cooking platform from above.

One embodiment relates to a method of barkmode cooking using an outdoor pellet grill. The method of barkmode cooking includes providing an outdoor pellet grill that includes a grill housing including a grill base, a rear wall, a top wall, and a hinged grill cover providing selective enclosure around an interior cooking space. The outdoor pellet grill includes a cooking platform, that holds food in the interior cooking space, coupled within the grill housing. The outdoor pellet grill further includes a pellet hopper adjacent the grill housing. The outdoor pellet grill further includes a burn pot covered by a heat baffle located in the grill base. The burn pot and the heat baffle further located beneath the cooking platform and provide heat to food from below. The outdoor pellet grill further includes an auger extending between the pellet hopper and the burn pot that transports pellets of fuel from the pellet hopper to the burn pot. The outdoor pellet grill further includes a squirrel cage blower in the grill base proximate the burn pot and heat baffle. The outdoor pellet grill further includes grill ductwork that defines a cavity extending from the squirrel cage blower in the grill base, up the rear wall and along the top wall of the grill housing to an opening above the cooking platform. The method of barkmode cooking includes directing wood pellets with the auger. The method of barkmode cooking includes igniting wood pellets within the burn pot. The method of barkmode cooking includes receiving food on the cooking surface for cooking. The method of barkmode cooking includes directing heat to the cooking surface from below. The method of barkmode cooking includes running the squirrel cage blower, to pull in smoke from the burn pot and direct smoke through the ductwork and out the opening above the cooking platform onto the top of food and to create a "bark" on the outer surface of the food, while continuing to direct heat to the cooking surface from below.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which:

FIGS. 2A-2D show a burn pot of an outdoor pellet grill, according to an embodiment.

Figure 1A:
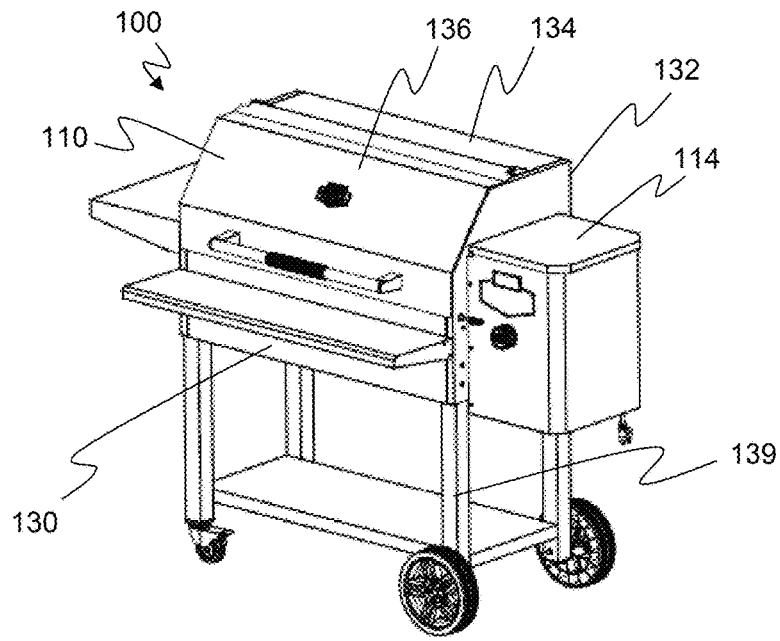
FIG. 1A is a perspective view of an outdoor pellet grill, according to an embodiment.
Figure 1B:
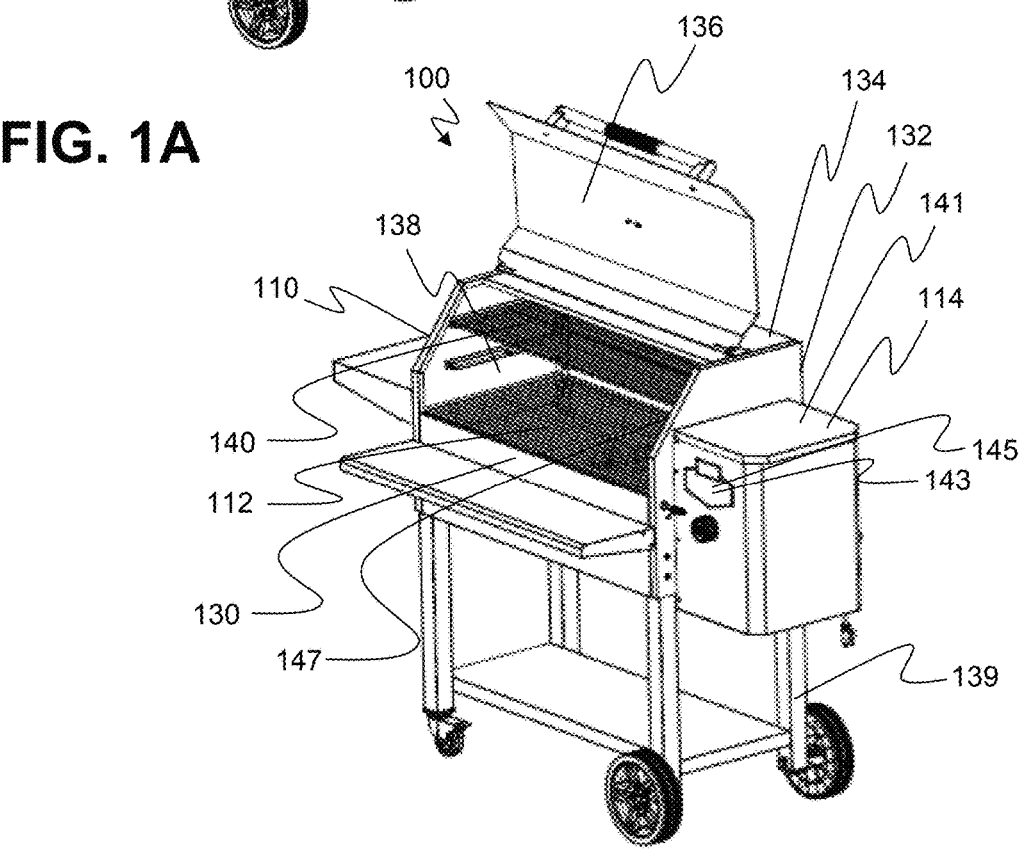
FIG. 1B is a perspective view of an outdoor pellet grill with an open cover, according to an embodiment.
Figure 2A:
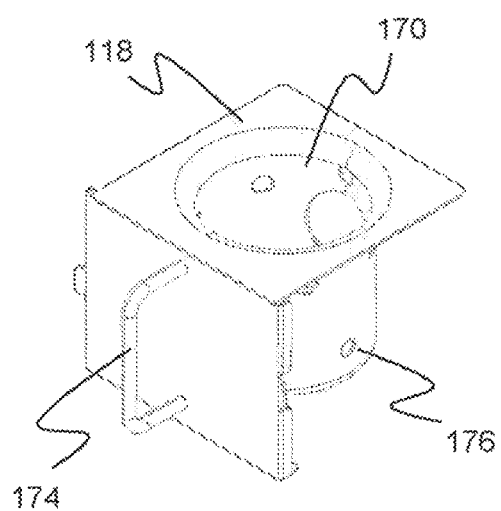
Figure 2B:
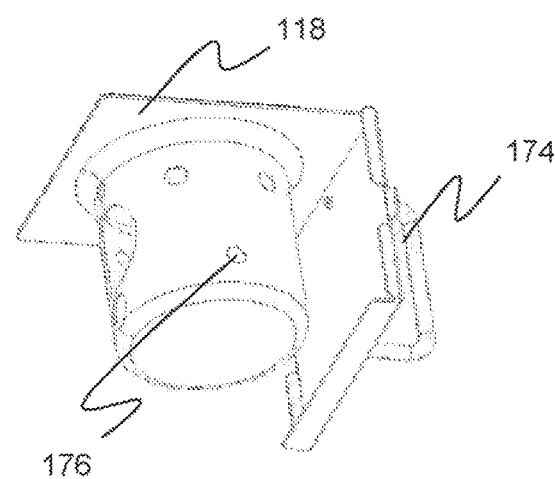

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally relate to outdoor pellet grills. Throughout this disclosure, the term "outdoor pellet grill" or "pellet grill" may be used to generally refer to any of a variety of different types of pellet grill, outdoor pellet grill, wood fueled grill with automated supply, other types of grills that do not rely primarily on gas, charcoal, or electricity as their primary source of heating fuel for cooking, and should be understood to broadly encompass these types of apparatus.

FIGS. 1A thru 4H each show an outdoor pellet grill 100 in various configurations or portions or parts of such an outdoor pellet grill 100. Referring first to FIGS. 1A and 1*i*, the outdoor pellet grill 100 includes a grill housing 110, a cooking platform 112, and a pellet hopper 114. Also included in the outdoor pellet grill 100, but not shown in these figures, are a burn pot 118 (see FIGS. 2A-3A) and an auger 120 (See FIGS. 2D and 6). Although not present in FIGS. 1A and 1B, some specific embodiments of an outdoor pellet grill 100 may include grill ductwork 116 and a squirrel cage blower 122. Such embodiments relate to outdoor pellet grills 100 adapted for barkmode cooking and are primarily discussed in the specification with reference to FIGS. 6-8.

Grill housing 110 includes of a grill base 130 that is centrally located and shaped to at least partially surround the cooking platform 112 and many of the internal components of the outdoor pellet grill 100. The grill housing 110 further includes a rear wall portion 132, a top wall portion 134, and a hinged grill cover 136. The rear wall portion 132 is secured to the grill base 130 and generally extends vertically from the grill base 130 and serves as the back of the grill. The top wall portion 134 is secured to the rear wall portion 132 and extends forward in a horizontally-disposed fashion. The top wall portion 134 may primarily serve as the top of the grill either alone or in combination with the hinged grill cover 136. Hinged grill cover 136 provides selective enclosure around an interior cooking space 138 within the grill housing 110. The cover 136 can take on various shapes and comprised of one main panel or several panels to cover the front access to the interior cooking space 138. Interior cooking space 138 includes the interior cavity formed within the grill housing 110 which is heated by the grill. Closing the cover 136 allows warming the interior cooking space 138 and the air and any food items contained therein to a desired temperature.

The grill housing 110 and grill base 130 generally are supported by a support structure 139. Support structure 139 may include vertically-disposed legs and cross-bracing, support panels, racks or other type of stand that raises the housing 110 to a useful height. In some embodiments, the support structure 139 will include wheels. In some embodiments, the support structure 139 will be hinged and/or collapsible for ease of transport.

Cooking platform 112 is generally considered to include the plurality of grates that are horizontally disposed across the grill base 130. Accordingly, the cooking platform 112 holds food in the interior cooking space 138 and is coupled within the grill housing 110. Accordingly, the cooking platform 112 is considered to be the lower surface of the interior cooking space 138. Food being cooked is generally placed upon the cooking platform 112. Also contained within the interior cooking space can be an upper cooking rack 140.

Pellet hopper 114 is located at the right hand side of a user of the outdoor pellet grill 100 adjacent the grill housing 110. The pellet hopper 114 provides a container which can be filled with wood pellets or other suitable pellet-like fuel for the grill to burn. In some embodiments, these pellets are loaded from the top into the pellet hopper 114 by pivoting open a pivotable cover 141. Also included as part of the pellet hopper 114 is a set of controls 143 that are controlled by a control panel display 145. These controls 143 can determine how quickly pellets are delivered to the burn pot 118 and the temperature and method that the grill operates. The control panel display 145 permits digital temperature control and can relay heat information from probes inside of the grill. In some embodiments, a set of probes 147 is stored within the pellet hopper 114. These probes 147 can be inserted through an aperture or passageway in the side of the pellet hopper 114 and placed directly into the interior cooking space 138 of the grill 100. The probes 147 remain coupled to the controls 143 and can help determine the cooking temperatures within the grill housing 110 as well as the food being cooked.

The burn pot 118 and other interior components can be more fully understood from diagrams of these components and systems, as seen in FIG. 2-4H for example. As shown in FIG. 2A-D, the burn pot 118 provides the heat source for cooking. Accordingly, the heat and smoke generated for cooking is entirely provided by burning wood pellets in the burn pot 118. Burn pot 118 provides direct heat to the cooking platform 112 from below as well as heat and smoke generally. The burn pot 118 is covered by a heat baffle 146 located in the grill base 130. The burn pot 118 and heat baffle 146 are further located beneath the cooking platform 112 and provide heat to food from below.

FIGS. 2A-D shows a burn pot 118 including a handle 174. The burn pot 118 is removable from the grill 100 by opening the grill cover 136, removing the grates from the cooking platform, and accessing the handle 174 to remove it from the grill base 130. Specifically, the burn pot 118 can disengage from latch 175 and be removed from its coupled engagement with the feeder box 177 that surrounds the auger 120. This removable burn pot design permits easy clean up. Namely, ashes contained in the burn pot 118 can be readily emptied by merely clipping out the burn pot 118 from the housing 110.

An auger 120 extends between the pellet hopper 114 and the burn pot 118. Auger 120 transports pellets of fuel from the pellet hopper 114 from the pellet hopper 114 to the burn pot 118. It should be understood that suitable augers 120 of all types and styles can be used that have transportation capabilities of fuel from a pellet hopper 114 location to a burn pot 118 location where heat can be generated.

The housing of the burn pot 118 can surround components and provide a central aperture 170 and recess in which combustion takes place. The burn pot 118 further includes air holes 176 to bring in fresh air flow. A handle 174 can be used for easy insertion and removal of the burn pot 118. The burn pot 118 can be made of sheet metal in some embodiments. The burn pot 118 has air holes 176 for airflow and couples with the auger 120.

Figure 3:
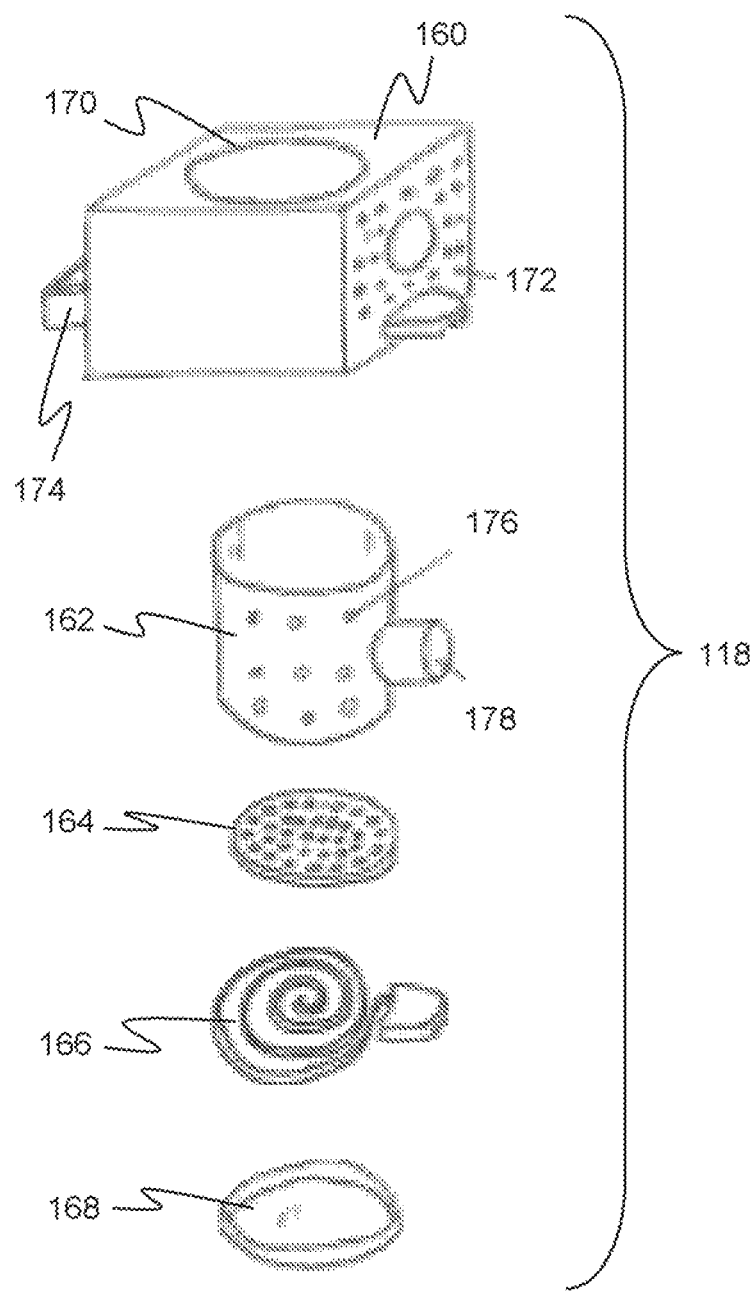
FIG. 3 is an exploded view of an alternate embodiment of a burn pot of an outdoor pellet grill, according to an embodiment.
Figure 3A:
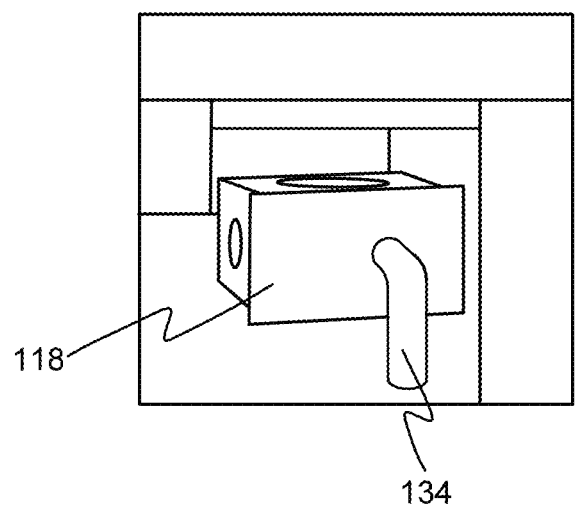
FIG. 3A is a perspective view of an alternate embodiment of a burn pot of an outdoor pellet grill, according to an embodiment.

FIGS. 3 and 3A show the components of a somewhat different alternate embodiment of a burn pot 118 shown in detail. Specifically, in FIG. 3A, an exploded view of the burn pot 118 includes a burn pot housing 160, a pot housing 162, a pellet grid 164, a coil heater/igniter 166 and a cap 168. The burn pot housing 160 surrounds the components and provides a central aperture 170 and recess in which combustion takes place. The burn pot housing 160 further includes air holes 172 to bring in fresh air flow from a combustion fan. There is further, a handle 174 that can be used for easy insertion and removal of the burn pot 118. The pot housing 162 has air holes 176 for airflow and a connector 178 that couples with the auger 120. Further, a removable pellet grid 164 is shown which keeps pellets off the coil heater/igniter 166 below and creates consistent heat dissipation. The coil heater/igniter 166 is used to initiate combustion of wood pellets or other fuel within the burn pot 118. Finally, cap 168 can be spot welded to the bottom of the pot housing 162 to contain the components of the assembly. As shown in FIG. 3A, the burn pot 118 can be removed from the outside of the grill by handle 134.

FIGS. 4A-H disclose a heat baffle 146 and/or associated rotatable actuator 184 and handle 188 from various views which provides a searing station for the grill 100. The heat baffle 146 can be used for heat control and specifically, for controlled searing of food located on the cooking platform 112.

Figure 4A:
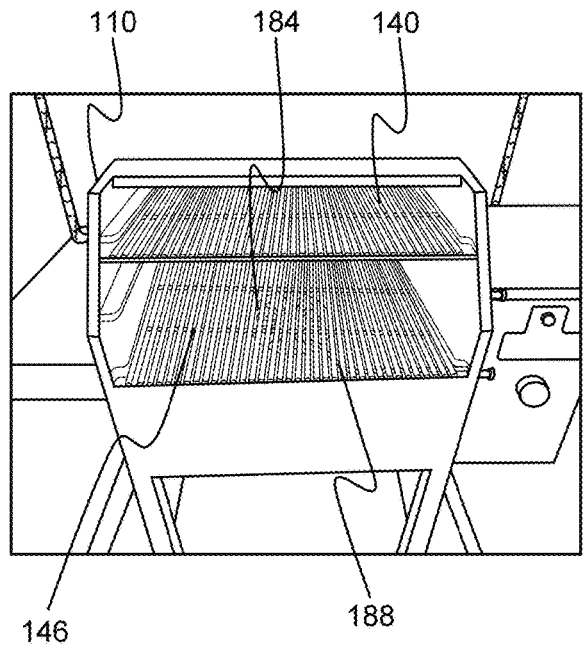
FIG. 4A-D show a partial perspective views of an interior cooking space of an outdoor pellet grill showing a rotatable actuator and handle providing a searing station, according to an embodiment.
Figure 4B:
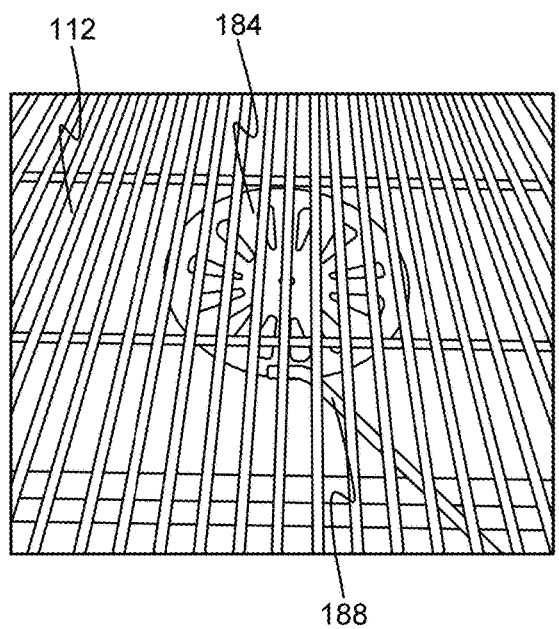
Figure 4C:
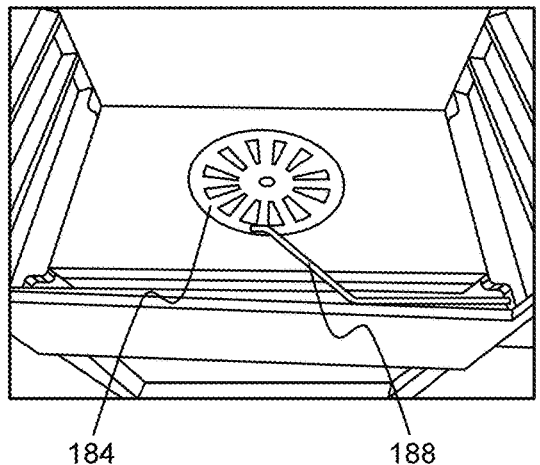
Figure 4D:
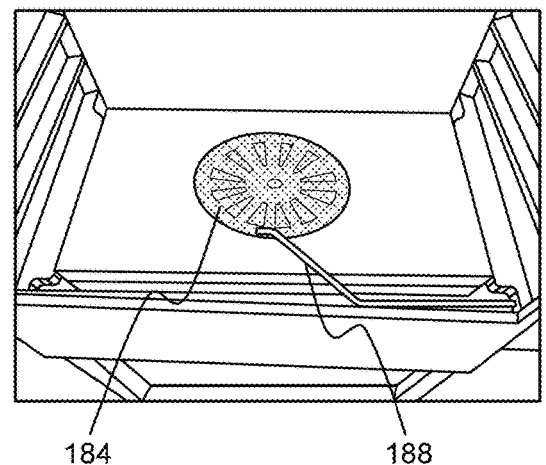
Figure 4E:
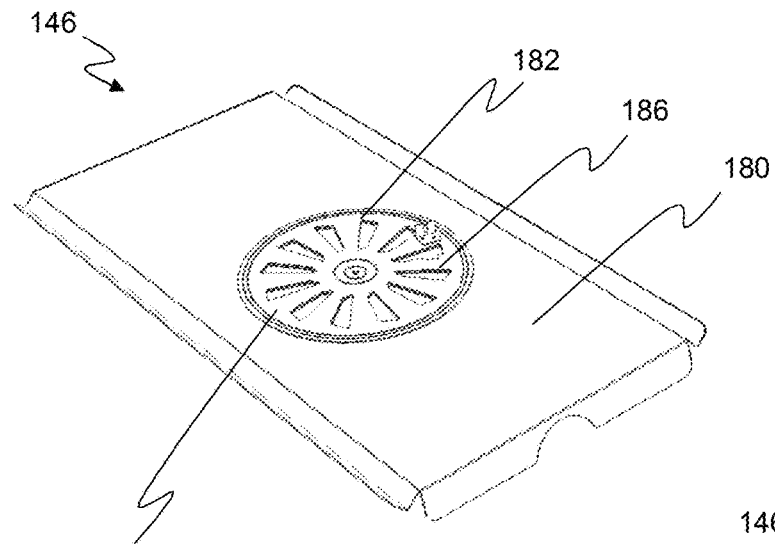
FIGS. 4E and 4F show partial schematic views of a heat baffle for an outdoor pellet grill, according to an embodiment.
Figure 4F:
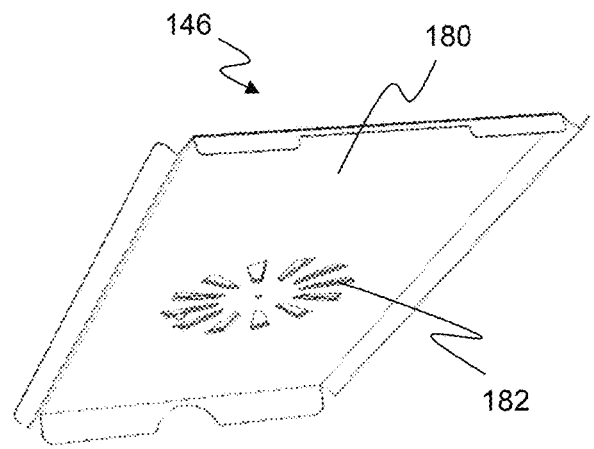
Figure 4G:
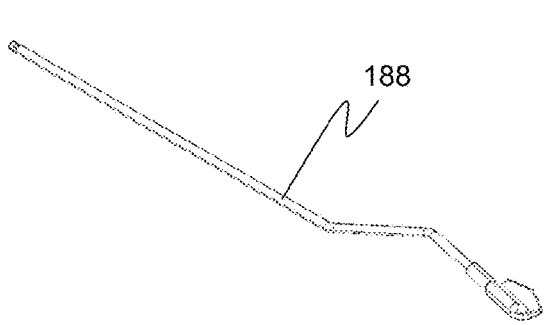
FIG. 4G shows a handle of a heat baffle searing station for an outdoor pellet grill, according to an embodiment.
Figure 4H:
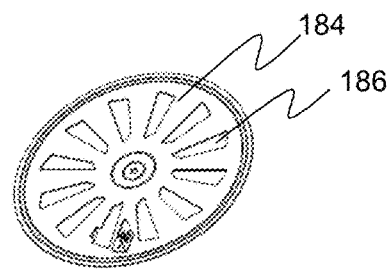
FIG. 4H shows a rotatable actuator of a heat baffle searing station for an outdoor pellet grill, according to an embodiment.

In FIGS. 4E and 4F the heat baffle 146 can be seen providing a flat heat shield 180 in which a plurality of radially displaced apertures 182 are located. Above these apertures 182 is disc-shaped rotatable actuator 184 which contains radial apertures 186. Radial apertures 186 are shaped to align with the below aperture 182 when the actuator 184 is rotated into alignment. A handle 188 is coupled to the actuator 184 at one end, and extends out the side of the housing 110 at the other end. See FIGS. 4C and 4D. Accordingly, the end of the handle 188 extending out of the housing 110 can be used to control radial movement of the actuator 184 and align or obstruct passageway between apertures 182 and 186. For example, FIG. 4C shows open passages and FIG. 4D shows closed passages. Alignment of the apertures generally permits flames from the burn pot 118 located below to come through and up to the cooking surface. Accordingly, the heat baffle 146 uses a rotatable actuator 184 to open and close apertures 182 and 186 to regulate flames from the burn pot 118. This in turn enables user-controlled searing of food.

Figure 5A:
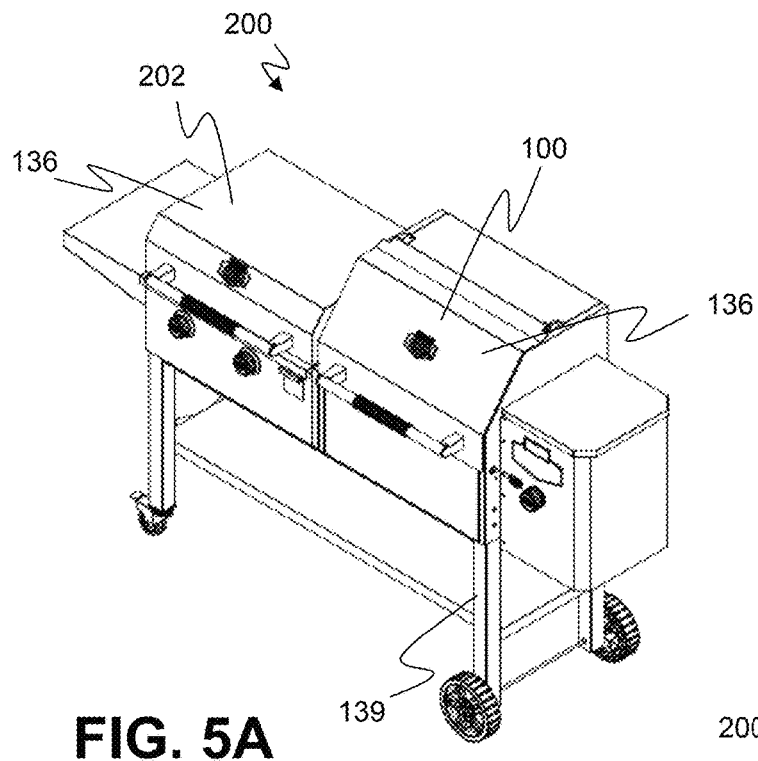
FIG. 5A is a perspective view of an outdoor grilling assembly that includes an outdoor pellet grill and an outdoor griddle, according to an embodiment.
Figure 5B:
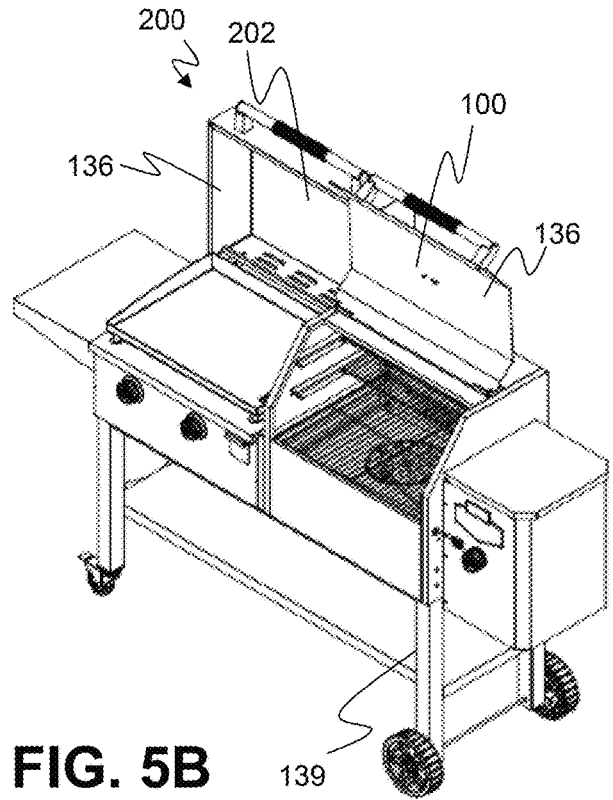
FIG. 5B is a perspective view of an outdoor grilling assembly of FIG. 5A that includes an outdoor pellet grill and an outdoor griddle where the grill and griddle covers are open, according to an embodiment.

FIGS. 5A and 5B show an outdoor grilling assembly 200 that includes an outdoor pellet grill 100 and an outdoor griddle 202 on a common frame or support structure 139. In FIG. 5A, the covers 136 of the respective apparatus are closed, and in FIG. 5B the covers 136 of the respective apparatus are open. In general, the cooking operations of the pellet grill 100 and outdoor griddle 202 are largely separate from one another and rely on separate independent heat sources. One heat source being gas burners and one heat source being a wood pellet burning pot. However, having both of these types of apparatus in close proximity can permit a broader range of food items to be simultaneously or sequentially prepared.

Figure 6:
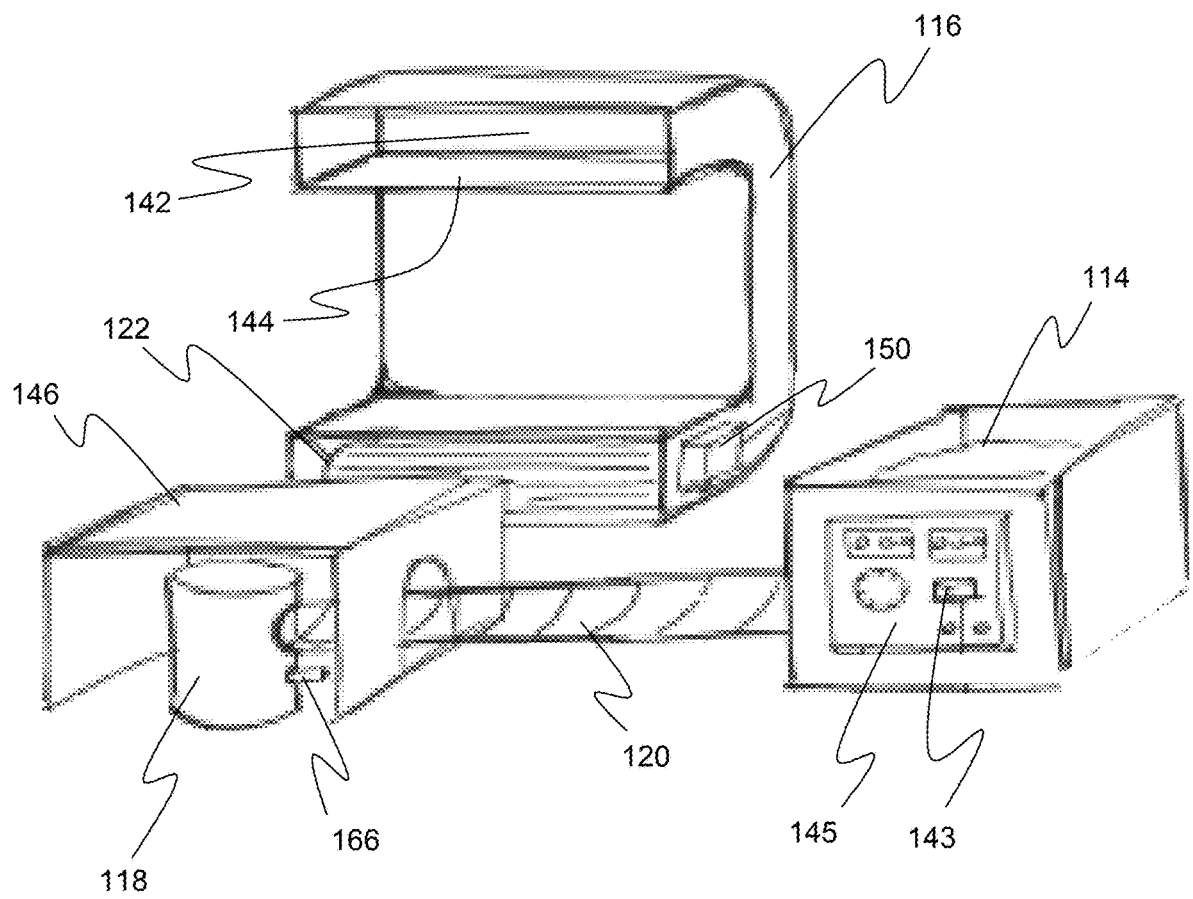
FIG. 6 is a schematic view of various internal components of an outdoor pellet grill adapted for barkmode grilling, according to an embodiment.
Figure 7A:
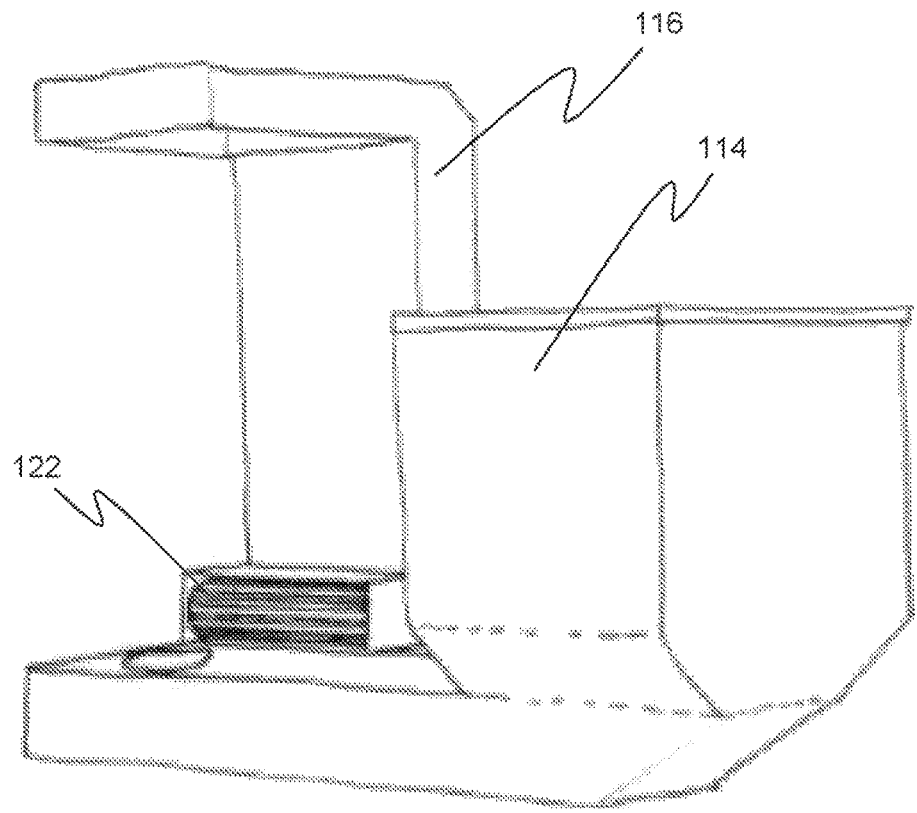
FIG. 7A is schematic view of various internal components of an outdoor pellet grill adapted for barkmode cooking, according to an embodiment.
Figure 7B:
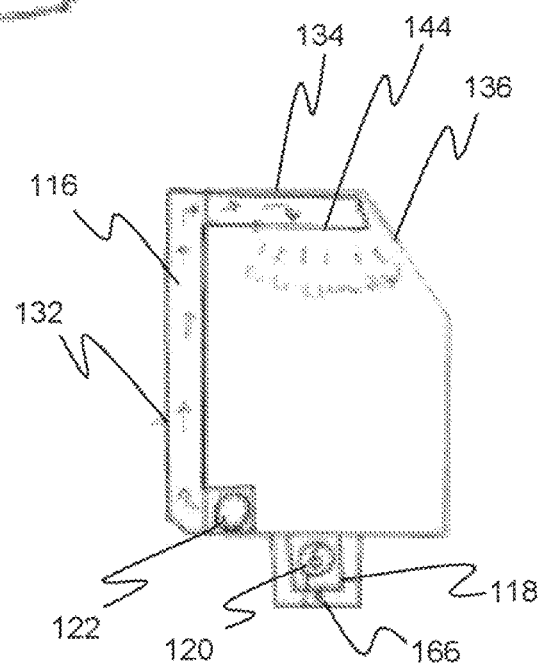
FIG. 7B is a partial cross-sectional view of an outdoor pellet grill adapted for barkmode cooking, according to an embodiment.
Figure 7C:
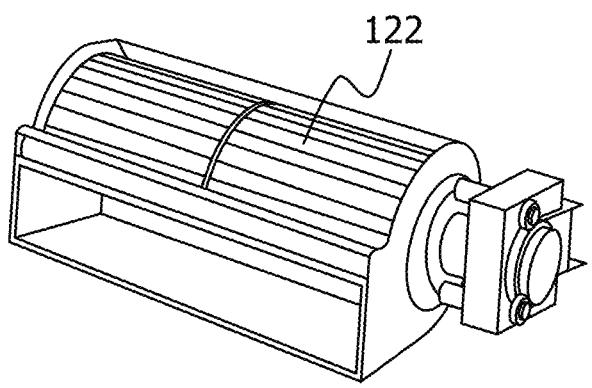
FIG. 7C is a squirrel cage blower for use in an outdoor pellet grill adapted for barkmode cooking, according to an embodiment.
Figure 8:
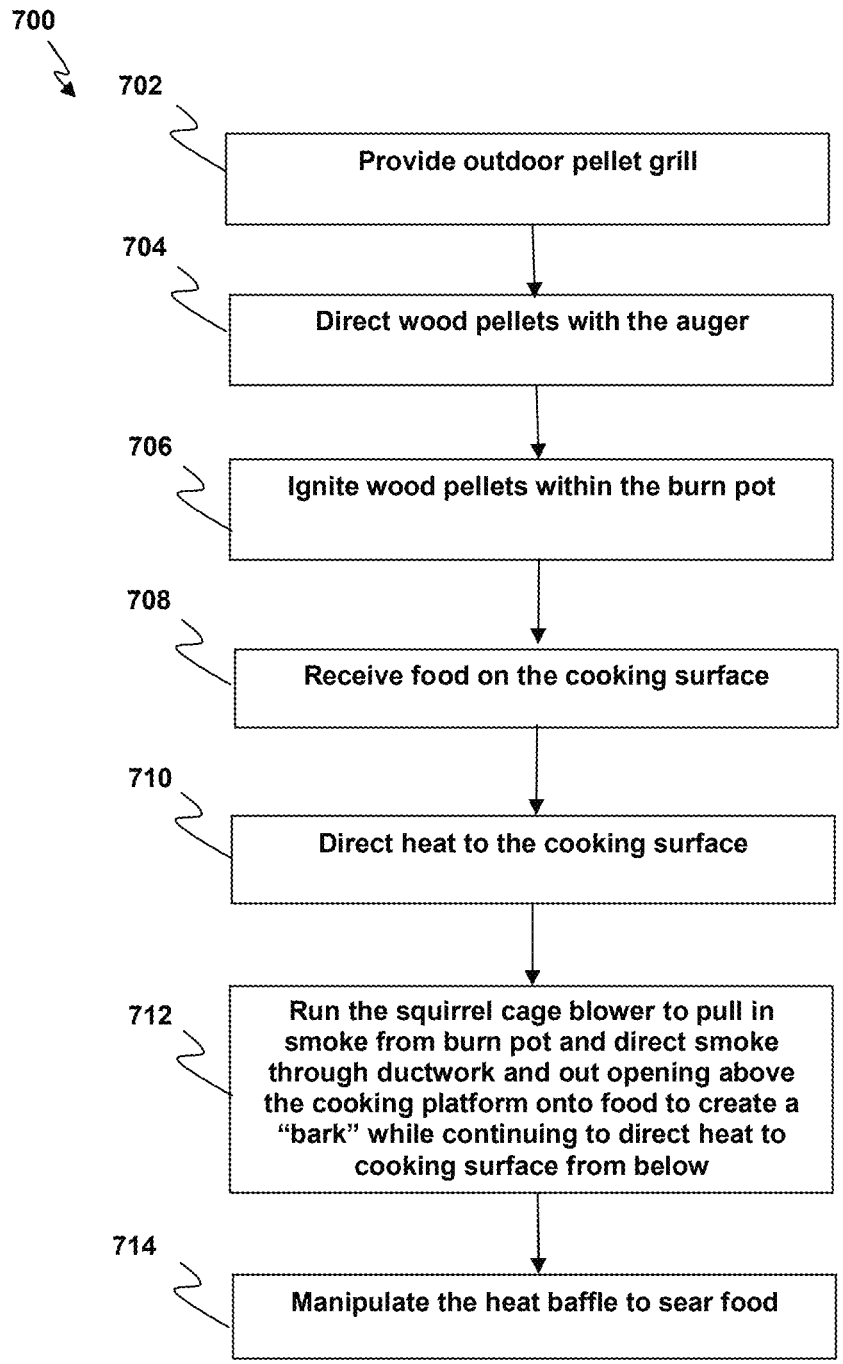
FIG. 8 shows a flowchart for a method of barkmode cooking, according to an embodiment.

FIGS. 6 thru 8 contemplate a specific alternate embodiment of a pellet griddle 100 in which the structure is adapted for a specific type of cooking referred to as "barkmode". In general, barkmode cooking requires the grill to pull smoke up from the burn pot 118 of a pellet grill 100 and direct it up to cook the top surface of food from above. The hot smoke focused on food creates a bard on the exterior surface of the food which provides the desired favor and texture of a type of authentic BBQ.

This type of barkmode cooking largely utilizes grill ductwork 116 and a squirrel cage blower 122 to accomplish the movement of smoke and heat necessary for this type of cooking. As shown in FIGS. 6-7C, grill ductwork 116 is located within the grill housing. Grill ductwork 116 defines a cavity 142 that extends from the squirrel cage blower 122 in the grill base 130, up the rear wall portion 132 and along the top wall portion 134 of the grill housing 110 to an opening 144 above the cooking platform 112. In some embodiments, the ductwork 116 provides a pathway with a "C" shaped cross-section. See FIGS. 6, 7A, and 7B. In some embodiments, the grill ductwork 116 is primarily run externally of the grill housing 110 and only the final horizontally-disposed segment of the grill ductwork 116, and opening 144 contained therein, enters the interior cooking space 138 of the grill 100.

Squirrel cage blower 122 is located in the grill base 130 proximate the burn pot 118 and the heat baffle 146. The squirrel cage blower 122 is powered by a blower motor 150 and selectively directs smoke produced by the burn pot 118 to the opening 144 above the cooking platform 112. This is done such that smoke can be focused on food on the cooking platform 112 from above. Specifically, squirrel cage fans pull heat and flame into the grill ductwork 116 and vents it out above the cook platform 112, upper cooking rack 140, or other cooking surface. Squirrel cage blowers 122 are depicted in FIGS. 6, 7A, and 7B.

It is noted that controls 143 can be used to allow a user to selectively turn on and off the squirrel cage blower 122 which makes "barkmode" cooking possible. Further, it is noted that the upper cooking rack 140 of a grill 100 that may also be referred to as a barkmode broiling station due to its proximity to smoke directed to this portion from above when the grill is in a "barkmode" setting.

As disclosed in FIG. 8, various methods 700 of "barkmode" cooking using a pellet grill 100 are made possible using an outdoor pellet grill 100 as described. Embodiments of barkmode cooking pull smoke from the burn pot 118 of a pellet grill 100 and direct it up to cook the top surface of food from above. Heated smoke focused on food helps to create a bard on its exterior. This "bark" is critical to the favor and texture of a desired type of authentic BBQ.

Such a method 700 can include first providing an outdoor pellet grill 100 at 702. This can include providing an outdoor pellet grill 100 that includes a grill housing 110 including a grill base 130, a rear wall 132, a top wall 134, and a hinged grill cover 136 providing selective enclosure around an interior cooking space 138. The outdoor pellet grill 100 includes a cooking platform 132 that holds food in the interior cooking space 138, coupled within the grill housing 110. The outdoor pellet grill 100 further includes a pellet hopper 114 adjacent the grill housing 110. The outdoor pellet grill 100 further includes a burn pot 118 covered by a heat baffle 146 located in the grill base 130. The burn pot 118 and the heat baffle 146 further located beneath the cooking platform 112 and provide heat to food from below. The outdoor pellet grill 100 further includes an auger 120 extending between the pellet hopper 114 and the burn pot 118 that transports pellets of fuel from the pellet hopper 114 to the burn pot 118. The outdoor pellet grill 100 further includes a squirrel cage blower 122 in the grill base 130 proximate the burn pot 118 and heat baffle 146. The outdoor pellet grill 100 further includes grill ductwork 116 that defines a cavity 142 extending from the squirrel cage blower 122 in the grill base 130, up the rear wall 132 and along the top wall 134 of the grill housing 110 to an opening 144 above the cooking platform 112.

The method 700 of barkmode cooking includes directing wood pellets with the auger 120 at 704. Augers 120 of different operational modes are possible.

The method of barkmode cooking includes igniting wood pellets within the burn pot 118 at 706. This can include use a coil heater and plug.

The method of barkmode cooking includes receiving food on the cooking surface 112 for cooking at 708. Cooking surface 112 is primarily comprised of horizontally disposed grates in various embodiments.

The method of barkmode cooking includes directing heat to the cooking surface 112 from below at 710.

The method of barkmode cooking includes running the squirrel cage blower 122, to pull in smoke from the burn pot 118 and direct smoke through the ductwork 116 and out the opening 144 above the cooking platform 112 onto the top of food and to create a "bark" on the outer surface of the food, while continuing to direct heat to the cooking surface 112 from below at 712. In some embodiments this will include utilizing controls that include a pellet grill cooking mode and a barkmode cooking mode.

Some methods will further include the step of manipulating the heat baffle 146 to sear the food being cooked at 714. In some methods, food is cooked only by wood fueled combustion providing smoke and heat. In some methods, the outdoor pellet grill 100 is part of an outdoor grilling assembly 200 that includes an outdoor griddle 202 having an independent heat source for cooking as well.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An outdoor pellet grill, comprising:
 a grill housing including:
  a grill base;
  a rear wall portion secured to the grill base;
  a top wall portion secured to the rear wall portion; and
  a hinged grill cover providing selective enclosure around an interior cooking space within the grill housing;
 a cooking platform coupled within the grill housing, wherein the cooking platform holds food in the interior cooking space;
 a pellet hopper adjacent the grill housing, the pellet hopper including a set of probes housed in the pellet hopper, the set of probes configured to be inserted through a passageway in a side of the pellet hopper adjacent to the grill housing, wherein the set of probes access the interior cooking space of the grill upon being inserted through the passageway and remain coupled to a set of controls;

a burn pot covered by a heat baffle located in the grill base, the burn pot and the heat baffle further located beneath the cooking platform and provide heat to food from below;
an auger extending between the pellet hopper and the burn pot that transports pellets of fuel from the pellet hopper to the burn pot;
an actuator, rotatably coupled to the heat baffle, that includes a first set of apertures positioned for selective alignment with a second set of corresponding apertures in the heat baffle to govern regulation of flames from the burn pot;
a squirrel cage blower associated with the grill base proximate the burn pot and the heat baffle; and
grill ductwork defining a cavity extending from the squirrel cage blower of the grill base to an opening above the cooking platform, wherein the squirrel cage blower directs smoke produced by the burn pot through the grill ductwork to the opening above the cooking platform such that smoke is focused down onto the cooking platform from above while continuing to direct heat to the cooking platform from below, wherein a bark texture is created on an outer surface of food placed onto the cooking platform.

2. The outdoor pellet grill of claim 1, wherein the actuator is coupled to a handle that extends outside the grill housing, enabling user directed positioning of the actuator to provide food searing control.

3. The outdoor pellet grill of claim 1, wherein heat and smoke generated for cooking is entirely provided by burning wood pellets in the burn pot.

4. The outdoor pellet grill of claim 1, wherein the burn pot is latchably releasable and removable from the grill housing.

5. The outdoor pellet grill of claim 1, wherein the pellet grill includes a control panel display that controls the set of controls, permits digital temperature control and relays heat information from probes located inside the grill.

6. The outdoor pellet grill of claim 1, wherein the outdoor pellet grill is part of an outdoor grilling assembly that includes an outdoor griddle having an independent heat source for cooking as well.

7. The outdoor pellet grill of claim 1, further including:
a control panel display, wherein the set of controls determine how quickly pellets are delivered to the burn pot and temperature at which the grill operates.

8. The outdoor pellet grill of claim 7, wherein the grill ductwork provides a pathway with a C shaped cross-section extending from the squirrel cage blower in the grill base, up the rear wall portion and along the top wall portion of the grill housing to the opening above the cooking platform.

9. The outdoor pellet grill of claim 7, wherein the grill ductwork provides a pathway with a C shaped cross-section, and wherein a portion of the grill ductwork is external to the grill housing, and wherein a horizontally-disposed segment of the grill ductwork enters the interior cooking space of the grill.

10. The outdoor pellet grill of claim 1, wherein an igniter or coil heater is provided to begin combustion of wood pellets in the burn pot.

11. A method of barkmode cooking using an outdoor pellet grill, comprising:
providing the outdoor pellet grill comprising:
a grill housing including a grill base, a rear wall a top wall, and a hinged grill cover providing selective enclosure around an interior cooking space;
a cooking platform coupled within the grill housing, wherein the cooking platform holds food in the interior cooking space;
a pellet hopper adjacent the grill housing, the pellet hopper including a set of probes housed in the pellet hopper, the set of probes configured to be inserted through a passageway in a side of the pellet hopper adjacent to the grill housing, wherein the set of probes access the interior cooking space of the grill upon being inserted through the passageway and remain coupled to a set of controls;
a burn pot covered by a heat baffle located in the grill base, the burn pot and the heat baffle further located beneath the cooking platform and provide heat to food from below;
an auger extending between the pellet hopper and the burn pot that transports pellets of fuel from the pellet hopper to the burn pot;
a squirrel cage blower in the grill base proximate the burn pot and the heat baffle;
grill ductwork defining a cavity extending from the squirrel cage blower in the grill base, up the rear wall and along the top wall of the grill housing to an opening above the cooking platform;
directing wood pellets with the auger;
igniting wood pellets within the burn pot;
receiving food on the cooking platform for cooking;
directing heat to the cooking platform from below; and
directing smoke through a C-shaped grill ductwork defining the cavity extending from the squirrel cage blower in the grill base, up the rear wall and along the top wall of the grill housing to the opening above the cooking platform wherein the squirrel cage blower directs smoke through the grill ductwork and out the opening above the cooking platform down onto a top of food and to create a bark texture on an outer surface of the food, while continuing to direct heat to the cooking platform from below.

12. A method of claim 11, further including manipulating the heat baffle to sear the food being cooked.

13. A method of claim 11, wherein controls include a pellet grill cooking mode and a barkmode cooking mode.

14. A method of claim 11, wherein food is cooked only by wood fueled combustion providing smoke and heat.

15. A method of claim 11, wherein the outdoor pellet grill is part of an outdoor grilling assembly that includes an outdoor griddle having an independent heat source for cooking as well.

16. An outdoor pellet grill, comprising:
a grill housing including:
a grill base;
a rear wall portion secured to the grill base;
a top wall portion secured to the rear wall portion; and
a grill cover providing selective enclosure for an interior cooking space within the grill housing;
a cooking platform within the grill housing;
a pellet hopper adjacent the grill housing, the pellet hopper including a set of probes housed in the pellet hopper, the set of probes configured to be inserted through a passageway in a side of the pellet hopper adjacent to the grill housing, wherein the set of probes access the interior cooking space of the grill upon being inserted through the passageway and remain coupled to a set of controls;

a burn pot covered by a heat baffle located in the grill base, the burn pot and the heat baffle located beneath the cooking platform, wherein the cooking platform is heated from below;

a squirrel cage blower in the grill base proximate the burn pot and the heat baffle; and grill ductwork defining a C shaped cavity extending from the squirrel cage blower in the grill base, up the rear wall portion and along the top wall portion of the grill housing to an opening above the cooking platform, wherein the squirrel cage blower and the grill ductwork directs smoke from the grill base through the grill ductwork to the opening above the cooking platform such that smoke is focused down onto the cooking platform from above, while continuing to direct heat to the cooking platform from below, wherein a bark texture is created on an outer surface of food placed onto the cooking platform.

\* \* \* \* \*